G. FERGUSON.
HOSE BAND.
APPLICATION FILED DEC. 14, 1909.
993,444.
Patented May 30, 1911.
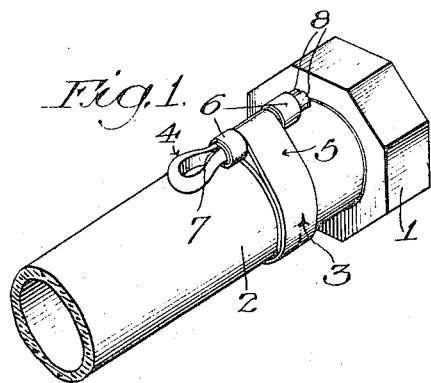
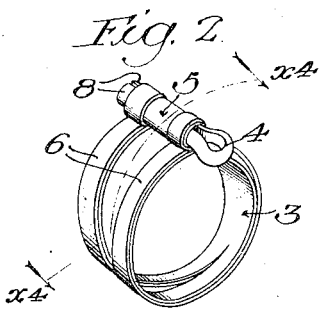
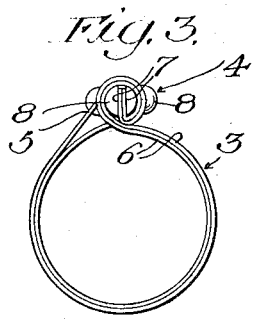
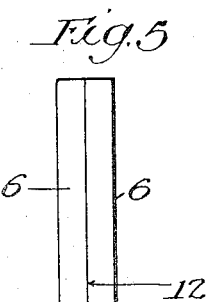
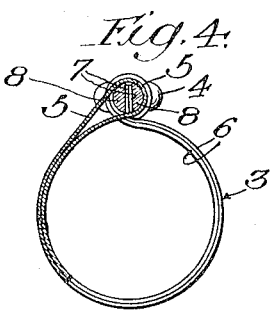
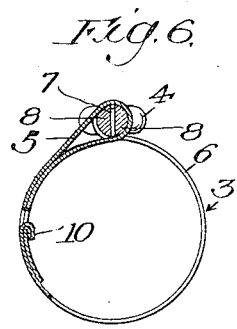
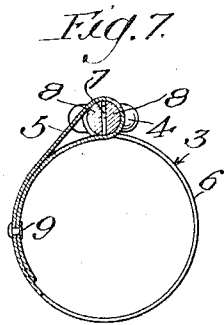
Witnesses:
Inventor:
George Ferguson,
by Townsend Lyon & Hackley
his Attys

UNITED STATES PATENT OFFICE.

GEORGE FERGUSON, OF LOS ANGELES, CALIFORNIA.

HOSE-BAND.

993,444. Specification of Letters Patent. Patented May 30, 1911.

Application filed December 14, 1909. Serial No. 533,120.

*To all whom it may concern:*

Be it known that I, GEORGE FERGUSON, a citizen of the United States, residing at Los Angeles, in the county of Los Angeles and State of California, have invented a new and useful Hose-Band, of which the following is a specification.

The object of my invention is to provide a hose band for use in fastening the end of a hose coupling into a rubber hose, which will bind the hose onto the house coupling in a firm and secure manner.

Another object of my invention is to provide a hose band which will be cheap to construct and simple in its operation.

The accompanying drawings illustrate my invention.

Figure 1 is a perspective view illustrating my invention in use in coupling a rubber hose to the female member of a hose coupling. Fig. 2 is a perspective view of the hose band. Fig. 3 is an elevation of the same. Fig. 4 is a vertical section on the line $x^4$—$x^4$ Fig. 2. Fig. 5 is a plan view of the blank from which the band is formed. Fig. 6 is a modified form of the band. Fig. 7 is another modification of the same.

1 indicates the female member of a hose coupling which is provided with the usual hollow member which is inserted in the hose 2.

3 is the hose band formed from an oblong strip of metal.

4 is the cotter pin.

5 is a loop which encircles the cotter pin.

6, 6 are tongues formed by splitting the end of the band.

7, 7 are the ends of the tongues 6, 6 which are inserted between the members 8, 8 of the cotter pin 4.

9 is a rivet and 10 are bent over tongues.

11 is a flat body of metal from which the band is formed.

In the manufacturing of the simplest form of my invention I employ an oblong sheet of metal such as 11 which is preferably split at both ends as at 12, 12 for a portion of its length, such slits extending from each end toward the center of the sheet and thereby forming tongues adapted to be spread apart laterally in V form. Such band is bent upon itself to form the loop 5 through which is inserted a cotter pin 4 which has been spread apart sufficiently to admit the ends of the tongues 7 to be inserted between the cotter pin members 8, 8 on each side of the loop, as shown in Figs. 1, 2, 3 and 4. The cotter pin is then rotated to roll the ends 6, 6 about the cotter pin as shown, the band meanwhile being held in shape over a former to give the same a circular contour; it being understood that the slitted portions 6, 6 are sprung outwardly from each other so that the loop portion 5 is between the two tongue members 6, 6.

When it is desired to use the hose band to clamp the hose upon the hose coupling, the hose band is slipped upon the end of the hose and the hose coupling is inserted within the hose and the cotter pin 4 is rotated by any suitable implement to wind up the tongues 6, 6 until the desired pressure upon the hose is attained.

In the forms shown in Figs. 6 and 7, I employ an oblong sheet of metal having a slit at one end only, which is spread apart as illustrated in in Fig. 2, with the ends of the split portion embracing the loop portion, and I employ a fastening means such as 9 or 10 to secure the other end of the loop to the main body of the band. Such fastening means may be supplied by cutting registering tongues through the band and folding the tongues back upon themselves as shown in Fig. 6, or a rivet 9 may be employed for holding the sheet in place to form the loop 5 as shown in Fig. 7.

By providing an oblong sheet of metal and slitting the ends as shown, and spreading such ends or tongues apart and inserting the ends of such split portions between the members of the cotter pin, I am enabled to furnish a strong and secure bearing for such cotter pin in the loop 5, and when such cotter pin with the ends of the tongues 6 inserted therein is rotated to bind the hose, the binding of such tongues 6, 6 upon the cotter pin holds said cotter pin firmly in place and prevents its accidental slipping or displacement from the loop.

By forming a loop such as 5, I provide a true bearing for the cotter pin and such cotter pin will rotate easily therein when the same is twisted to wind up the tongues 6, 6 thereupon, and I am thereby enabled to provide a hose band which is easily operated and of great compressing power which will securely fasten the hose upon the hose coupling member.

It will be seen that by forming the band from a narrow strip of material and forming the tongues by splitting the end of the same, and spreading such tongues apart in V-shape to lie on each side of the loop formed by bending the strip of material upon itself, that I am enabled to produce such band with the least possible amount of material and without any waste thereof in cutting. It is also apparent that by providing the two tongues on each side of the loop that a straight pull will be exerted upon the band where the cotter pin is rotated.

What I claim is:

1. A hose band comprsing an oblong body bent upon itself to form a loop, two tongues at a free end of such oblong body formed by splitting the end of such body for a portion of its length toward its center, such tongues being spread apart in V-form to lie one on each side of the loop formed by the body and a cotter pin in the loop and engaging with the ends of the tongues.

2. A hose band formed from an oblong sheet body split at each end for a distance along its length and being bent upon itself to form a loop in its unslitted portion, the split ends of such body being spread apart in V-form to lie one on each side of the loop portion, and a cotter pin in the loop and in engagement with the ends of the split portion on each side of the loop.

In testimony whereof, I have hereunto set my hand at Los Angeles, California, this 2nd day of December, 1909.

GEORGE FERGUSON.

In presence of—
F. M. TOWNSEND,
FRANK L. A. GRAHAM.